United States Patent Office 2,927,704
Patented Mar. 8, 1960

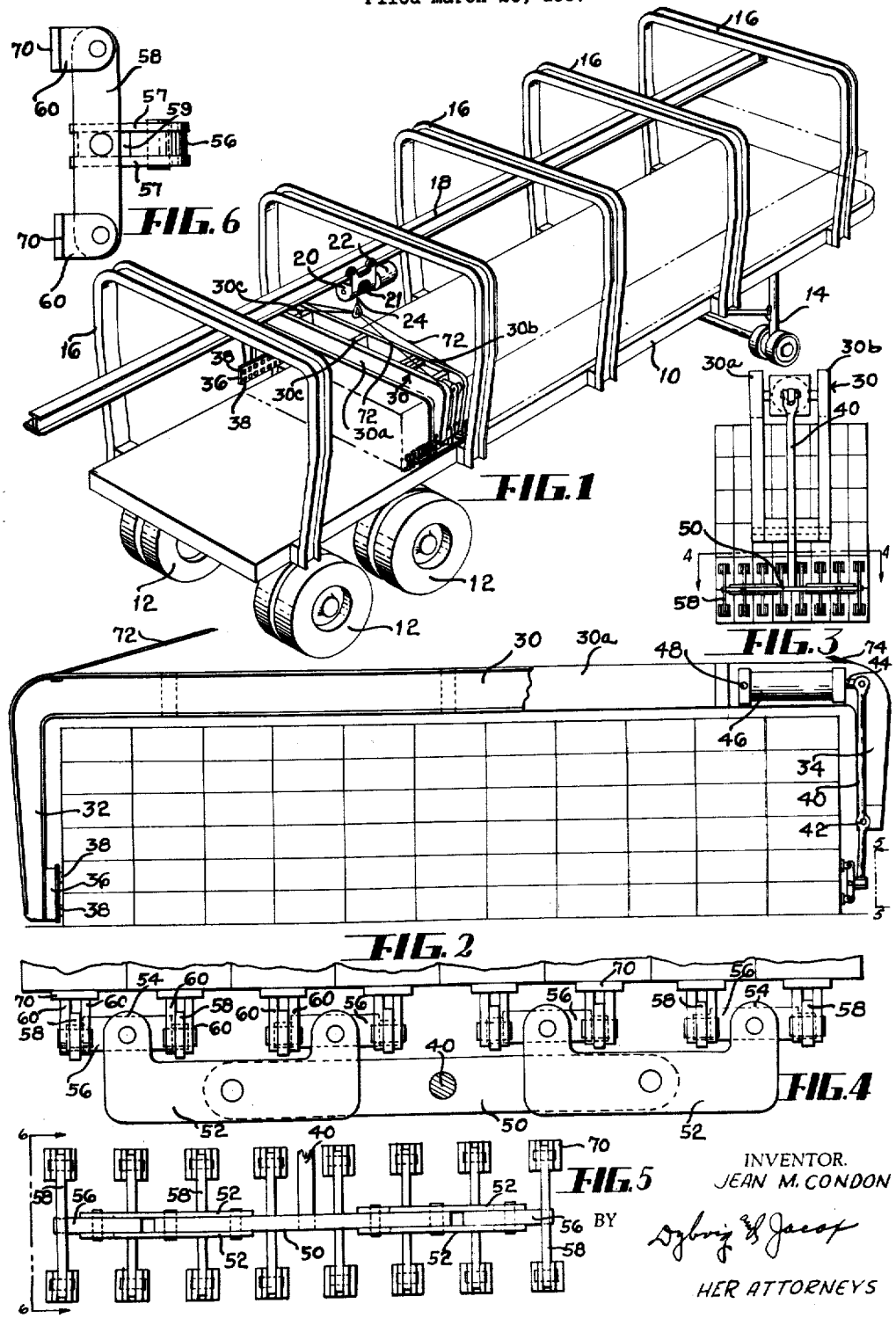

2,927,704
HYDRAULIC DEVICE
Jean M. Condon, Dayton, Ohio
Application March 26, 1957, Serial No. 648,611
2 Claims. (Cl. 214—75)

This invention relates to apparatus for and a method of handling bricks, blocks and other similar materials and more particularly to a device for loading and unloading bricks, cement blocks, et cetera, to and from transportation vehicles, although not necessarily so limited.

The handling of building materials, such as bricks, cement blocks, building tile, et cetera, has presented a problem which has not in the past been adequately solved. It probably is safe to state that the first method used was to manually load and unload the bricks. Then tongs were developed that were manually handled and that could lift a group of aligned bricks. This has expedited the loading and unloading of bricks. The bricks have been loaded on pallets, the pallets with the bricks thereon being raised by a suitable electric or hydraulic lift truck. This, however, presents problems, in that when a load of bricks is delivered to the job, there ordinarily is not an electric lift truck available. Some have gone to the extreme in handling bricks by using a dump truck, so as to dump the bricks helter-skelter.

An object of this invention is to provide a device associated with a truck or other transportation vehicle, or for that matter, in a brick yard, where a comparatively large block of bricks is raised and lowered by means of a lift that is provided with equalizers or equalizing means, whereby the lower rows of bricks in a block are compressed so as to use the bricks in this lower row or two as a support for the overlying bricks.

Other objects and advantages reside in the construction of parts, the combination thereof, the method of manufacture and the mode of operation, as will become more apparent from the following description.

Referring to the drawings,

Figure 1 is a perspective view of the brick loading and unloading device mounted upon the bed of a trailer.

Figure 2 is an end view of bricks and a portion of a loading mechanism, with parts broken away.

Figure 3 is an end elevational view of one end of a brick handling mechanism.

Figure 4 is a fragmentary view, taken substantially on the line 4—4 of Figure 3.

Figure 5 is an enlarged view of the equalizing mechanism looking in the direction of the arrows 5—5 in Figure 2.

Figure 6 is an end view of a portion of the equalizing mechanism, as viewed in the direction of the arrows 6—6 of Figure 5.

In the drawings, the reference character 10 indicates the bed of a trailer that has been used for the purpose of illustration. This could be the bed of a truck, the bed of a flat car, a platform or floor in a brick yard, the floor of a barge, the deck of a ship, or any other suitable brick supporting or brick conveying mechanism. In the particular modification shown, one end of the trailer is supported upon dual wheels 12 and the front end is temporarily supported upon a dolly 14. Under the front end of the bed 10 there may be a fifth wheel member, adapted to cooperate with the fifth wheel member of a tractor for transporting the load.

The bed 10 is provided with a plurality of substantially inverted U-shaped members 16 supporting a rail or track 18. This rail or track 18 may be in the form of an I-beam, adapted to support a carriage 20. This carriage may be provided with a drum 21 that is driven either electrically or hydraulically by a motor 22 used in raising and lowering a cable 24 supporting the brick manipulating mechanism, which will now be described.

The main frame consists of an inverted substantially U-shaped structure 30, having a downwardly projecting leg 32 at one end and another downwardly projecting leg 34 at the opposite end. This U-shaped structure 30 may consist of two U-shaped members 30a and 30b held in spaced relation by plates 30c. The downwardly projecting leg 32 may be provided with a transverse bar 36 extending parallel to the longitudinal axis of the bed 10. This bar 36 is provided with a plurality of pads 38 arranged in pairs. As may best be seen by referring to Figure 1, the pads 38 are arranged in rows, so as to engage the ends of the two lower layers or rows of bricks. The pads 38 are preferably so spaced that there will be one pad for each brick.

These pads are urged against the sides of the layers of bricks by a hydraulic mechanism. This particular embodiment discloses a hydraulic mechanism that includes a vertically disposed bar or lever 40, pivoted at 42 to the lower end of the downwardly projecting leg 34. The upper end of the lever 40 is pivotally attached to a piston rod 44, actuated by a piston in a cylinder 46 supplied with suitable hydraulic fluid through an intake opening 48. The lower end of the lever 40 is attached to a transverse equalizing bar 50.

Each end of this bar 50 has pivotally mounted thereto oppositely disposed pairs of equalizing links or bars 52, the two pairs of links being identical. Each end of each link 52 is provided with a lobe 54. A link 56 is pivotally attached to a pair of lobes 54. All of the links 56 are substantially identical. As best seen in Figure 6, the ends of the links 56 support pairs of coupling links 57 straddling a member 59 pivotally attached to a vertically disposed link 58. Each end of each link 58 supports a pair of brackets 60 having mounted thereon a pad 70. The links 50, 52, 54 and 58 are pivotally mounted at their centers, so that these links form equalizing links or bars. These links may be referred to as eveners. The pads 70 are located directly opposite the pads 38, so that as pressure is supplied by the hydraulic cylinders 46 to rotate the lever 40 in a clockwise direction, as viewed in Figure 2, the ends of the equalizing bars 50 will exert equal pressure to all of the links 52 and the links 52 will apply equal pressure to the links 56 and the links 56 will apply equal pressure to the links 58 and the links 58 will apply equal pressure to all of the pads 70.

It can readily be seen that equal and opposite pressure is applied to each row of bricks contacted by the pads, so as to firmly hold the bricks in a row together, even though there may be a slight irregularity in the width of the bricks, in that the equalizing mechanism equalizes the force applied to all of the rows coming in contact with the lifting mechanism. By applying sufficient force to the upper end of the lever 40, sufficient pressure can be applied to the entire two lowermost layers of bricks underlying the lifting mechanism, so that these two layers of bricks form, so to speak, a floor for all of the bricks located above these layers.

As soon as the pads have been energized to firmly clamp the rows of bricks in the lower tiers, then the U-shaped structure 30 and the bricks supported thereby may be raised by means of a plurality of cables 72 connected to the lower end of the cable 24, so that upon winding the cable 24 upon the drum 21 in the carriage 20, the entire block of bricks may be raised and, after they have been raised, the carriage may be run along the track 18 from whence the bricks may be lowered to the ground or upon a previous pile of bricks, as the case may be.

This same mechanism may be used in loading bricks upon a truck, the first block of bricks being loaded starting at the front end of the bed, then succeeding blocks being loaded until the bed is fully loaded. In unloading the bricks, successive blocks, beginning from the rear end of the load, may be removed, until the entire load has been unloaded.

The superstructure for the bed may, in some cases, be eliminated in the event overhead cranes are available. This could be the case in a brick yard where bricks are loaded on to flat cars or on to trailers or into barges or on the decks of ships, or transported from one place to another within the brick yard.

Although only one of the legs of the inverted U-shaped member is provided with equalizing mechanism, equilizing mechanism could be used on both legs. Furthermore, instead of using only one cylinder for exerting pressure upon the pads associated with the equalizing mechanism, a number of cylinders could be used for dividing the load. Instead of one cylinder, the other extreme would be to provide one cylinder for each pad. This is a matter of choice. Also, instead of using a hydraulic cylinder or hydraulic cylinders, solenoids could be used for exerting pressure upon the ends of the rows of bricks. Whatever the equalizing means may be, it is desirable that equal clamping pressure be applied to all of the rows of bricks engaged by the pads, so as to firmly press all of the bricks in a row into firm contact with each other.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A brick loading and unloading mechanism for use with transportation vehicles having a bed, said mechanism including a track, means for mounting the track above the bed, said means including supports extending from the track to the sides of the bed, a carriage mounted on the track, said carriage having a drum, a cable adapted to be wound upon the drum in the carriage, a brick supporting device, means for attaching said brick supporting device to said cable, said brick supporting device including a substantially inverted U-shaped member adapted to straddle a block of bricks arranged in rows and tiers, a plurality of brick engaging pads aligned with rows of bricks and aligned with two overlying rows, means for mounting the pads on one of the legs of the U-shaped member, a plurality of brick engaging pads mounted on the other leg of the U-shaped member, and equalizing means for applying pressure to at least one set of pads for clamping opposite ends of rows of bricks, the pressure applied to the pads being equalized so that the same clamping force is exerted on the ends of each of the rows of bricks engaged by the pads.

2. A brick manipulating device according to claim 1, wherein the equalizing means includes a plurality of horizontally disposed links, there being at least one link for each pair of tiers across the ends of the block of bricks, and a plurality of vertically disposed links, there being one vertically disposed link at each end of said one horizontally disposed link for each pair of tiers, each of said vertically disposed links having a pair of pads mounted thereon, said pads being adapted to engage the two lowest rows of bricks in the ends of said block of bricks.

References Cited in the file of this patent
UNITED STATES PATENTS

| | | |
|---|---|---|
| 2,491,805 | Fontaine | Dec. 20, 1949 |
| 2,497,600 | Grigsby | Feb. 14, 1950 |
| 2,554,433 | Warren | May 22, 1951 |
| 2,674,387 | Ehrmann | Apr. 6, 1954 |
| 2,732,083 | Smith | Jan. 24, 1956 |
| 2,763,383 | McCoy | Sept. 18, 1956 |
| 2,778,512 | Strona | Jan. 22, 1957 |
| 2,844,403 | Farmer et al. | July 22, 1958 |